United States Patent [19]

Leach

[11] 3,826,934

[45] July 30, 1974

[54] NONREVERSIBLE MOTOR
[75] Inventor: Robert D. Leach, Fort Wayne, Ind.
[73] Assignee: General Electric Company, Fort Wayne, Ind.
[22] Filed: Sept. 25, 1972
[21] Appl. No.: 292,176

[52] U.S. Cl. ............................................. 310/41
[51] Int. Cl. ............................................ H02k 7/10
[58] Field of Search ....... 310/41, 90; 188/82.6, 264; 184/64

[56] References Cited
UNITED STATES PATENTS

| 2,101,665 | 12/1937 | Arey | 310/41 |
|---|---|---|---|
| 2,633,950 | 4/1953 | Phaneuf | 310/41 |
| 3,319,098 | 5/1967 | Hartman | 310/90 |
| 3,432,699 | 3/1969 | Albinger | 310/41 |
| 3,543,064 | 11/1970 | Holper | 310/90 |
| 3,714,705 | 6/1973 | Lewis | 310/90 |

FOREIGN PATENTS OR APPLICATIONS

| 743,761 | 6/1944 | Germany | 310/41 |

Primary Examiner—R. Skudy

[57] ABSTRACT

Anti-windmilling arrangement includes an anti-reverse rotation spring mounted on the motor shaft. Spring is helically wound and mounted on shaft within bearing system enclosure to protect it from corrosive agents and is supplied with lubricant. One end of spring is loosely restrained by a stationary structure and other end is in a convolution adjacent the shaft. Spring winds up or closes and grips the shaft if shaft moves in a first direction of rotation. Spring unwinds or uncoils and only loosely contacts shaft during rotation of shaft in opposite direction. Spring contacts shaft while motor is idle but exerts negligible restraint against rotation of shaft in the desired direction. Contact between shaft and spring causes the spring to tighten substantially immediately as the shaft commences to rotate in undesired direction even when lubricant is present at the interface of the shaft and spring.

7 Claims, 4 Drawing Figures

PATENTED JUL 30 1974  3,826,934

NONREVERSIBLE MOTOR

BACKGROUND OF THE INVENTION

This invention relates to dynamoelectric machines and, more particularly, to electric motors which are provided with means for preventing rotation of the motor shaft in one direction.

In some applications for electric motors it is desirable that the shaft of the motor be rotatable in one direction only. Typical examples of such applications are those where a motor is utilized to drive an outdoor refrigeration or air conditioning system condenser fan; to drive window fans; and to drive exhaust fans, and so forth. However, in many fluid moving applications, including those just mentioned, undesired reverse rotation of the motor while it is not energized can occur.

For example, this can be caused by flow of air past a fan or other fluid moving device, connected to the motor in a direction to cause reverse rotation. This undesired reverse rotation has been referred to as "windmilling" and will be so referred to herein.

Windmilling can cause numerous problems and some of these are: loss of lubricant in sleeve bearing motors; and failure of some single phase motors to overcome the reverse rotation if an attempt is made to energize and start such motors while they are windmilling (e.g., sometimes such motors will continue to operate in the reverse direction).

Various attempts have been made heretofore to prevent undesired windmilling. Some of these attempts have included the use of electromagnetic brakes; unidirectional cogging devices; spring loaded sliding rotors which "brake" the motor when it is de-energized, and so forth. However, most of these approaches have not been satisfactory because of cost, noise, and wear of parts, to name but a few reasons.

Windmilling of electric motors frequently occurs, as will be understood from the above, in fan motor applications when the wind or air on the exhaust side of a fan or blower drives the fan in a reverse direction while the motor is not energized. In general, windmilling can occur whenever there is a pressure differential between the discharge and intake sides of the fan, (with the higher pressure on the exhaust side) while the motor is not energized. The windmilling phenomena can be both naturally and artificially induced. Naturally induced windmilling may occur, for example, in motor-fan combinations mounted in walls or roof tops where one side of the fan is exposed to the outside of the building and the other side is exposed to the inside of the building. On gusty, windy days the pressure outside and near the fan can be different than the pressure inside the building. Air then will move from the outside to the inside of the building or vice versa and drive the fan backwards. The most common example of an application such as this is a window fan.

An example of artificial windmilling would be one that occurs when fan units are staged together within a single housing. Staging is commonly used, for example, in roof top air conditioning condensing units. In these systems, a relatively large enclosure is provided with a number of air outlet ducts or openings and a motor driven fan is disposed in each of such ducts or openings. Air conditioning condenser coils are disposed across a single inlet opening for the enclosure. When a relatively small cooling load is placed on a system of this type, only one or two of the motors may be energized to transfer a desired amount of heat from the condensing coils. On the other hand, for maximum load conditions, all of the fans may be energized in order to provide maximum air movement past the condensing coils. In these applications, if one or more of the staged fan motors are de-energized while at least one of the other fan motors is energized, the energized motor will draw air through the condenser coils and also past the fans of the idle motors in a reverse direction. This causes "artificially induced" windmilling of the idle motors.

In each of the applications just described, the primary problem associated with windmilling is manifest if the motor is energized when the fan is being driven in a reverse direction (i.e., windmilling). In these situations the motor must be able to provide enough positive torque in the desired direction of rotation to stop the fan and then start turning in the desired direction. Unfortunately the positive torque produced by the motor upon initial energization is decreased with increasing windmilling speeds. In fact, at a predeterminable speed, the motor may produce no torque at all. At even higher windmilling speeds, the motor may produce negative torque and then continue to run in the reverse direction after energization. In any case, the motor will not be moving the air in the desired direction at the desired time.

Still other problems associated with windmilling are related to the lubrication systems of some types of motors. For example, if sleeve bearing are used in the motor and the motor is mounted with the shaft in a vertical position, inadequate amounts of oil may be provided for the bearing journals and accelerated bearing wear will take place, resulting in reduced motor life. This problem is generally thought to be associated with the fact that most sleeve bearing systems do not have sufficient oil recirculating ability to return a high percentage of oil to the bearing journals at low operational speeds and particularly for applications requiring vertically disposed shafts.

Historically, ball bearing systems have been used to cope with high oil loss problems and the motors have been designed to have sufficient torque to overcome wind during windmilling and bring the motor up to operating speed in the correct direction of rotation. Both of these remedies however, are costly and do not directly attack the windmilling problem. After studying this problem, I have concluded that the most economic and satisfactory approach would be one that would prevent the motor from starting to windmill and yet avoid the use of costly electromagnetic and complex mechanical devices that have been considered heretofore.

SUMMARY OF THE INVENTION

It is therefore an object of the present invention to provide a new and improved electric motor having economical and reliable means for preventing windmilling.

Another object of the present invention is to provide windmilling preventing means that may be quickly and economically assembled as part of a motor.

Still another object is to provide anti-windmilling means that may be quickly inspected and replaced in the field.

Yet another object of the present invention is to provide anti-windmilling means that will not adversely affect the expected life of the motor and that will be reliable in operation.

In carrying out the above and other objects, I provide an improved dynamoelectric machine with an anti-windmilling arrangement that is economical to utilize in practice and which overcomes the various problems mentioned above.

In one illustrated form, I provide an anti-reverse rotation spring mounted on the motor shaft. The exemplified spring is helically wound and mounted on the shaft within a bearing system enclosure so that it is protected against corrosion causing agents and, preferably, provided with a lubricant. One end of the spring is loosely restrained by a stationary portion of the motor (e.g., by the stator or an end shield) and the other end is terminated as part of a helical coil or convolution adjacent the shaft. The spring is arranged so that it will "wind up" and grip the shaft in a first direction of rotation of the shaft but will tend to uncoil and only loosely contact the shaft during rotation of the shaft in the opposite direction. This allows the shaft to turn relatively freely in a desired direction but prevents rotation in the opposite direction. The spring contacts the shaft while the motor is idle but exerts negligible restraint against rotation of shaft in the desired direction. However, the contact between the shaft and spring causes the spring to tighten on the shaft substantially immediately as the shaft commences to rotate in the undesired direction even when lubricant is present at the interface of the shaft and spring. The lubricant minimizes spring corrosion, and friction between the shaft and spring so as to prevent appreciable wear of the shaft during normal operation of the motor.

The subject matter which I regard as my invention is set forth in the claims appended to and forming a part of this specification. The invention itself, however, together with further objects and advantages thereof may be better understood by referring to the following more detailed description taken in conjunction with the accompanying drawing.

DESCRIPTION OF THE PREFERRED EMBODIMENT

Figure 1:
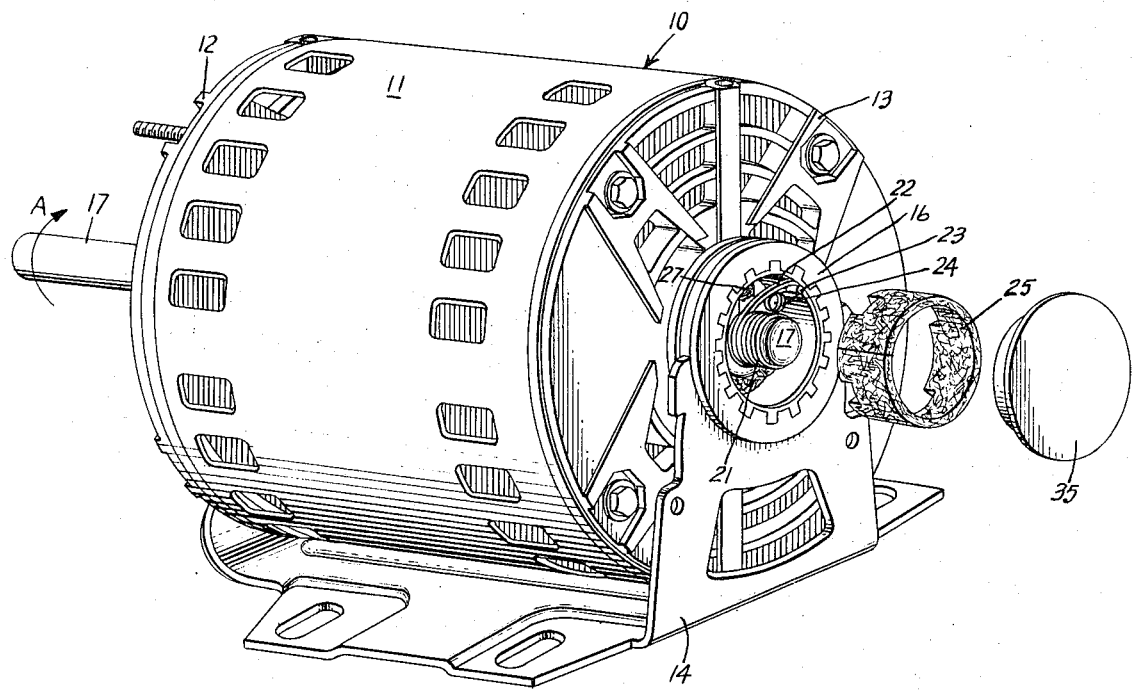
FIG. 1 is a perspective type view, with parts displaced from their normal assembled position, of a motor embodying the invention in one form.

Turning now to FIG. 1, there is shown a motor 10 which may be of conventional construction. The motor 10 includes a housing 11 that encloses a stator core and windings of any desired design, a pair of end frames 12, 13, a conventional not shown rotor stator core, and a cradle type base 14 which resiliently supports the stationary motor structure through conventional resilient mounting rings 16. Supported by each of the end frames 12, 13 are bearing systems of any desired construction. These bearing systems, in turn, rotatably support the shaft 17 and rotor body secured thereto as will be understood by persons skilled in the art. A fan or other device may be connected to the end of shaft 17 as will be understood.

It should be specifically noted, that while I have chosen a motor having a bearing at each end thereof for purposes of illustration, the invention may be utilized in motors having only one bearing (e.g., in "unit" bearing motors). Moreover, while the specific motor 10 is provided with a sleeve bearing system, the invention would be useful with motors having ball or roller bearings as well as in motors having the shaft extending from both ends thereof.

With particular reference now to the right-hand portion of FIG. 1, it will be seen that I have provided a helically wound spring 21 about a portion of the shaft 17. This spring is easily expanded for quick assembly on the shaft 17. The spring convolutions make sufficient contact with the shaft 17 to prevent windmilling as will be described in connection with FIGS. 2 and 3 hereinafter.

During assembly of the spring 21 onto the shaft 17, a curved portion 33 of spring leg 22 is slipped onto a post or boss 23 that may conveniently be formed as part of the end frame 13. A conventional fastener such as screw 24 is then threaded into an opening in the end frame to loosely trap curved portion 32 of the spring. The head of screw 24 holds the spring 21 in assembled relation with the shaft 17.

A second post or boss similar to the post 23 could be used in lieu of the fastener 24 and one or both of these posts could then be peened or headed to prevent undesired axial movement of the spring on the shaft and resultant disassembly of the spring and shaft.

The end 22 of the spring 21 is loosely restrained by the post 23 and screws 24 so that the section 26 of spring leg or end 22 may be relatively easily deflected or pivoted toward and away from the post 23. Upon energization of the motor 10 and rotation of the shaft in a desired direction indicated by the arrow A, the end 22 of the spring will move to the position shown in FIG. 2. Continued rotation of the shaft 17 in the direction of arrow A will maintain the spring 21 in a loosened or opened position on the shaft 17. During operation, oil or other suitable lubricant is positively fed to the spring 21 and the interface between the spring and shaft by means of a feed wick 27 that supplies lubricant from a lubricant storage material such as the felt member 25 (best shown in FIG. 1). The spring 21 exerts negligible restraint against rotation of the shaft in the direction A, and this restraint (and possible wear of the shaft) is even further minimized by the lubricant supplied thereto. The lubricant also tends to prevent or minimize corrosion of the spring 21.

Figure 3:
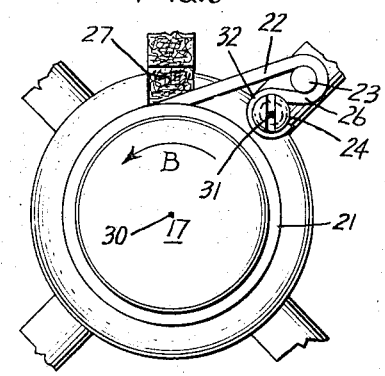
FIG. 3 is a view similar to FIG. 2 but showing a relationship of parts while reverse rotation of the motor shaft is attempted.
Figure 4:
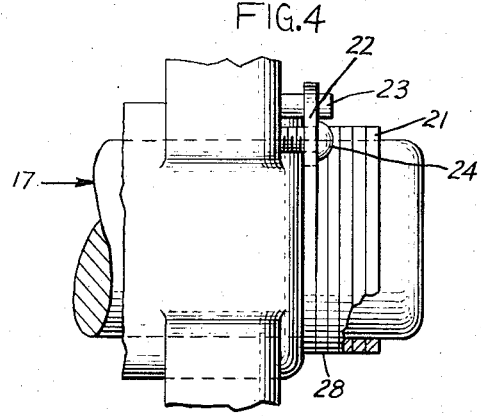
FIG. 4 is a side elevation of the structure shown in FIG. 2, parts again being broken away or removed for clarity.

If the shaft should start to rotate in the direction of the arrow B shown in FIG. 3 (as would occur with windmilling), the frictional engagement between the shaft 17 and convolutions 28 (see FIG. 4) of the spring will cause the end portion 26 of the spring to move against the post 23, followed by a tightening of the spring convolutions on the shaft 17. In essence, slight initial movement of the shaft 17 in the direction of the arrow B causes the coils to wind up or become more tightly coiled and grip the shaft 17 rather tightly so as to provide surprisingly great restraint against rotation of the shaft in the direction of arrow B. Thus rotation of the shaft in the undesired direction and windmilling is prevented.

It is believed that the foregoing description is complete, and teaches persons skilled in the art how to practice the invention. However, a more detailed description will also now be provided.

The shaft A was formed of conventional cold drawn steel having a finished diameter with a dimension of 0.6250 inches to 0.6247 inches. The spring 21 was formed of about six convolutions of 0.030 of an inch square spring wire with an unstressed or relaxed inner or bore diameter of 0.620 inches plus or minus 0.003 inches. The inner diameter of spring 21 was burr free. The axial length of the six spring convolutions, as measured in an axial direction (refer to FIG. 4) was approximately about one-fourth of an inch.

Figure 2:
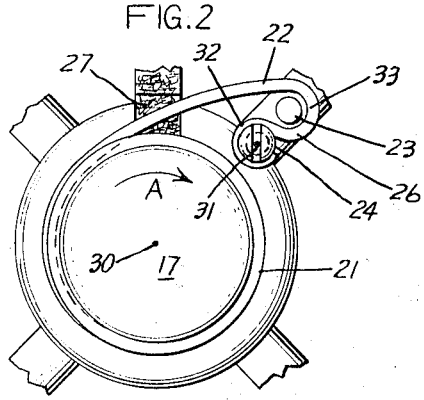
FIG. 2 is an end elevation, with parts removed and broken away, looking at the opposite pulley end of the motor of FIG. 1, to illustrate the relationship of motor shaft and spring when the shaft is rotating in a desired direction of rotation.

With reference now to FIG. 2, the radial distance from the nominal center 30 of the spring to the center of curvature 31 of the curved segment 32 was about 0.46 inches; and the radial distance between nominal center 30 of the spring and the center of curvature of the curved segment 33 of the spring was about 0.63 inches. The radius from the centers of curvature for the portions 32 and 33 to the inner surface of such curved portions was 0.05 inches in both cases, approximately.

With the above specified dimensions of parts, the shaft 17 will turn freely and quietly in the direction of rotation designated by arrow A, although the spring is under tension and at least slightly grips the shaft when initially assembled, with the shaft at rest.

The frictional engagement between the convolutions of the spring 21 and the shaft 17 during rotation of the shaft in the direction A causes the spring to unwind or open slightly. The spring thus is loosened on the shaft and exerts only a small drag against desired rotation of the shaft. However, upon rotation of the shaft in the direction B (see FIG. 3) the end 22 of the spring is pulled taut against the post 23 and the convolutions of the spring are tightened on the shaft 17 to substantially prevent any further rotation of the shaft in direction B. This all occurs when the shaft turns only a few degrees in the direction B (windmilling direction).

Six motors were constructed generally according to the exemplification shown in the drawings. Substantially the only difference between the motors tested and the arrangement shown in the drawing was that a post similar to post 23 was utilized in lieu of the threaded fastener 24 and various spring lubricating approaches were followed. After assembling the spring on the shaft and placing the lubricant storage member 25 within the bearing lubricant reservoir, an end cap 35 was pressed into place on the end frame of each test motor to seal the ends of the motors.

Two of the six motors, designated motors I and II, were constructed to have a shallow, axially extending groove in the surface of the shaft under the spring 21. This was done to provide a mode of positive lubrication for the spring convolutions. Two other motors, designated motors III and IV, utilized a feed wick similar to that shown at 27 in the drawing. The last two of the six test motors, motors V and VI, were provided without any means for positive lubrication of the spring. The posts 23 were, however, peened to prevent disassembly of the spring from the shafts.

The testing procedures were as follows: the motors (all of the sleeve bearing type) were positioned with the shafts thereof vertical and the pulley end of the shaft pointed upwardly. These motors were designed to operate from a conventional 230 volt, 60 Hz power supply and were run continuously from Monday morning to Friday afternoon for successive weekly periods. On each Monday morning and Friday afternoon, the motors were connected with the leads reversed to determine whether the shaft 17 would start to turn in a reverse direction and either slowly turn (i.e., slip), or turn relatively freely. Attempts were made to start the motor in the reverse direction while applying 115 volts and then while applying 230 volts. The locked rotor torque (and thus reverse direction torque applied to the springs in the test motors) was, for 230 volts, about 15 to 20 ounce feet; and for 115 volts, about 5 ounce feet. Power was supplied several times to each motor when attempting to cause a reversal so as to provide ample opportunity for the motors to reverse. The purpose of the attempts to reverse at the beginning of each Monday was to see if a cold motor would reverse since the motors would not have been energized over the weekend. Attempted reversals on Friday would show if any differences could be observed with the motors heated from being operated continuously for 5 days. These tests were run over a period of 2 months and at the end of this period, the following observations were made.

With regard to motors I and II, the spring was in place, the shaft and internal face of the end cap were very oily; the shaft showed signs of slight wearing; and in motor I there was discoloration of lubricant due to the presence of wear particles. There was no similar discoloration of lubricant in motor II.

With regard to motors III and IV, the shaft was oily, but less oily than in the motors I and II. No excess oil in the end cap was observed for motor III or IV. For both of motors III and IV the feed wick member 27 was oily but there was no evidence in either motor of discoloration of lubricant due to wear particles. In motor III, the spring 21 had slipped off the two mounting posts sometime toward the end of the test period, whereas the spring had remained in place throughout the test on motor IV.

In motors V and VI, the shaft and spring were not oily, and in motor V excessive wear particles were very evident. In motor VI, light fretting of the shaft was observed to have occurred. The spring had slipped on the mounting posts in motor V, but had not slipped off because the mounting posts for this motor had been peened or headed before starting the test.

Following the test period, all six motors were tested for noise level and it was concluded that the motors were extremely quiet, indicating that the use of the anti-reversing spring 21 did not objectionably increase the noise level of the motors, even when lubricant was not supplied thereto.

All of the motors I-VI were deemed to be satisfactory although all of the motors except motors I and VI slipped or reversed when 230 volts were applied during the reversal trials.

For each of these six motors, the shaft outer diameter and relaxed spring inner diameter were measured prior to starting the test and in each case, there was an interference fitting relationship because the inner diameter of the spring was smaller than the outer diameter of the shaft.

For the motors I and II, the interference was 0.0073 and 0.0034 inches respectively; for motors III and IV the interference was 0.0063 and 0.0033 of an inch respectively; and for motors V and VI, the interference was 0.0073 and 0.0043 inches, respectively.

For the motor I, slippage or reversal did not occur, even when connected to 230 volts. Slippage or reversal of motor II did occur at the beggining or end of each week when 230 volts were applied to motor II.

Motor III reversed when energized with 115 volts on one day, after the spring had slipped off the shaft. This same motor slipped or reversed on every day that a 230 volt reversing voltage was applied. Motor IV did not slip or reverse any time that 115 volts were applied and it slipped on only one day when 230 volts were applied.

Slip or reversal did not occur when 115 or 230 volts were applied to motor VI. However, 115 volts did cause motor V to reverse one day, after the spring had moved on the shaft. Slip or reversal also occurred on about half of the tests of motor V when 230 volts were applied.

From the foregoing data, it is believed that the presence of lubricant and the provision of some positive means of lubricating the spring is of value for reducing wear. Somewhat surprisingly, however, the presence of lubricant does not impair the anti-reverse action provided by the spring. It will be appreciated that the spring 21 is configured to restrain the shaft 17 from counterclockwise rotation as viewed in FIG. 2. In order to prevent clockwise rotation of shaft 17, it would be only necessary to wind a spring in the opposite direction from that of spring 21 or to axially reverse spring 21 and make pin 23 and screw 24 long enough to still retain the end of the spring.

From the foregoing description of the illustrated exemplification, it will be apparent that an improved anti-windmilling arrangement has now been provided that will overcome the above discussed problems in a reliable and economical manner. Accordingly, while the invention has been explained by describing a particular embodiment thereof, it will be apparent that changes may be made in the structure disclosed without departing from the scope of the invention. It is therefore intended in the following claims to cover all such equivalent variations as fall within the true scope of my invention.

What I claim as new and desire to secure by letters patent of the United States is:

1. An electric motor that is resistant to reverse direction windmilling, said motor comprising a rotor assembly having a rotatable surface; a stator assembly having windings energizeable for causing the rotor assembly to rotate in a first direction, said stator assembly including a bearing system enclosure; bearing means at least partly disposed in said bearing system enclosure and supporting the rotor for rotation relative to the stator assembly; and means located within said bearing system enclosure for providing a restraint against rotation of the rotor assembly in a reverse direction; said means including a helically wound spring having at least one convolution disposed adjacent to and in contacting engagement with the rotatable surface, and also having a portion secured against unrestrained rotation relative to the stator assembly; said at least one convolution being movable relative to said rotatable surface when forces are applied to said rotor assembly in response to energization of a winding portion of the stator assembly so that the rotor assembly is substantially unrestrained against rotation in a first direction when said winding portion is energized, but is restrained from rotation in a second direction.

2. The electric motor of claim 1 further including lubricant storage means disposed within said bearing system enclosure, and means for providing a flow of lubricant to said at least one convolution.

3. The electric motor of claim 1 wherein said at least one convolution is disposed around an outer peripheral substantially cylindrical rotatable surface; said outer peripheral surface having a first diameter; and said at least one convolution having a relaxed internal diameter less than said first diameter.

4. A dynamoelectric machine comprising a rotor assembly including a shaft, a stator assembly including a core and windings for driving the rotor assembly in a predetermined direction and a bearing lubricant reservoir, bearing means supporting the shaft for rotation relative to the stator assembly; and anti-reversing means disposed in the bearing lubricant reservoir and continuously engaging a surface movable with the rotor assembly; said anti-reversing means permitting the shaft to rotate continuously at a desired speed of rotation in the predetermined direction and substantially restraining the shaft from rotation in a direction opposite the predetermined direction.

5. The dynamoelectric machine of claim 4 wherein said anti-reversing means comprises a helically wound spring having at least one convolution extending adjacent to and in contact with a circumferentially extending surface; said spring including an extremity extending away from the shaft and held in a relatively fixed position relative to the stator assembly.

6. A dynamoelectric machine comprising a stator assembly that includes a bearing system enclosure and includes a lubricant reservoir, a rotor assembly, and bearing means supporting the rotor assembly for rotation relative to the stator; said rotor assembly including a shaft journalled for rotation in the bearing means; helical spring means disposed in the lubricant reservoir adjacent to and in engagement with a rotor assembly rotatable surface; said spring means loosely contacting the rotatable surface and permitting substantially unimpeded rotation of the shaft in a first forward direction, and firmly contacting the rotatable surface upon slight rotation of the shaft in a reverse direction thereby to substantially inhibit free rotation of the shaft in the reverse direction; lubricant storage material disposed in the lubricant reservoir; and means for providing a positive flow of lubricant to the interface of the spring means and rotatable surface.

7. The dynamoelectric machine of claim 6 wherein said means for providing a positive flow of lubricant comprises a lubricant feeding member disposed in contact with said spring means and in lubricant transferring relation with said lubricant storage material.

* * * * *